United States Patent [19]

Sorensen et al.

[11] Patent Number: 5,372,773

[45] Date of Patent: Dec. 13, 1994

[54] RAPID INJECTION MOLDING OF ELONGATED ARTICLES, SUCH AS CABLE TIES

[76] Inventors: Soren C. Sorensen, 12630 Carmel Country Rd., No. 110, San Diego, Calif. 92130; Jens O. Sorensen, P.O. Box 2274, Rancho Santa Fe, Calif. 92067

[21] Appl. No.: 811,576

[22] Filed: Dec. 20, 1991

[51] Int. Cl.⁵ .................... B29C 45/40; B29C 45/43
[52] U.S. Cl. .................... 264/328.1; 264/318; 264/334; 264/335; 425/437; 425/443; 425/556
[58] Field of Search .......... 264/318, 320, 334, 328.1, 264/274, 275, 333, 328.15, 511, 294; 425/441, 443, 129.1, 556, 588, 437, 438, 444

[56] References Cited

U.S. PATENT DOCUMENTS

| | | |
|---|---|---|
| 3,093,865 | 6/1963 | Peters et al. . |
| 3,159,878 | 12/1964 | Scott, Jr. et al. . |
| 3,537,676 | 11/1970 | Miller .................... 425/588 |
| 3,737,490 | 6/1973 | Nicholson . |
| 3,776,676 | 12/1973 | Kessler .................... 425/250 |
| 3,898,315 | 8/1975 | Haag .................... 264/334 |
| 3,965,538 | 6/1976 | Caveney et al. . |
| 4,005,164 | 1/1977 | Procter . |
| 4,192,701 | 3/1980 | Martin et al. . |
| 4,238,106 | 12/1980 | Willingham .................... 249/79 |
| 4,354,995 | 10/1982 | Wiechard .................... 264/275 |
| 4,427,618 | 1/1984 | Sorensen .................... 264/328.9 |
| 4,432,127 | 2/1984 | Diazzi .................... 425/588 |
| 4,473,524 | 9/1984 | Paradis . |
| 4,562,990 | 1/1986 | Rose . |
| 4,666,323 | 5/1987 | Kessler .................... 264/334 |
| 4,688,302 | 8/1987 | Caveney et al. . |
| 4,730,615 | 3/1988 | Sutherland . |
| 4,776,067 | 10/1988 | Sorenson .................... 24/16 PB |
| 4,793,793 | 12/1988 | Swenson et al. . |
| 4,833,741 | 5/1989 | Mizuno et al. . |
| 4,880,587 | 11/1989 | Fichlseder et al. .................... 264/334 |
| 4,902,218 | 2/1990 | Leonard et al. . |
| 4,944,475 | 6/1990 | Ono et al. . |
| 5,002,480 | 3/1991 | Geuert et al. . |
| 5,006,288 | 4/1991 | Rhodes, Jr. et al. .................... 264/275 |
| 5,028,225 | 7/1991 | Staheli .................... 425/588 |
| 5,042,535 | 8/1991 | Schlottke . |
| 5,053,179 | 10/1991 | Masui et al. .................... 264/275 |
| 5,096,651 | 3/1992 | LeConte . |
| 5,123,686 | 6/1992 | Wenk . |
| 5,131,613 | 7/1992 | Kamiya et al. . |
| 5,135,694 | 8/1992 | Akahane et al. . |
| 5,146,654 | 9/1992 | Caveney et al. . |

Primary Examiner—Jan H. Silbaugh
Assistant Examiner—Angela Y. Ortiz
Attorney, Agent, or Firm—Edward W. Callan

[57] ABSTRACT

A nylon cable tie having a head and a strap terminating in a tip is formed in a mold cavity defined between a first mold part combined wish a second mold part by injecting molten nylon material into the mold cavity through an insulated runner system and a gate that converges from the runner system toward the mold cavity and does not have a hot tip adjacent thereto. The mold parts are separated while retaining a portion of the head in a head region in the first mold part and a portion of the tip in a tip region in the second mold part, in order to separate the head from the second mold part, to separate the tip from the first mold part, and to separate a major portion of the strap from the first and second mold parts. The mold parts are further separated while retaining said portion of the head in the head region to thereby remove said portion of the tip from the second mold part. The head is ejected from the head region by protracted ejector pins that penetrate the head region from within the first mold part. A component containing a nozzle coupled to a source of compressed air and positioned closely adjacent the head region is protracted from the first mold part and pushes on the strap to push the ejected head of the cable tie away from the ejector pins. The cable tie is then ejected from between the mold parts by imparting against the ejected head of the cable tie a forceful stream of compressed air directed from the nozzle.

6 Claims, 2 Drawing Sheets

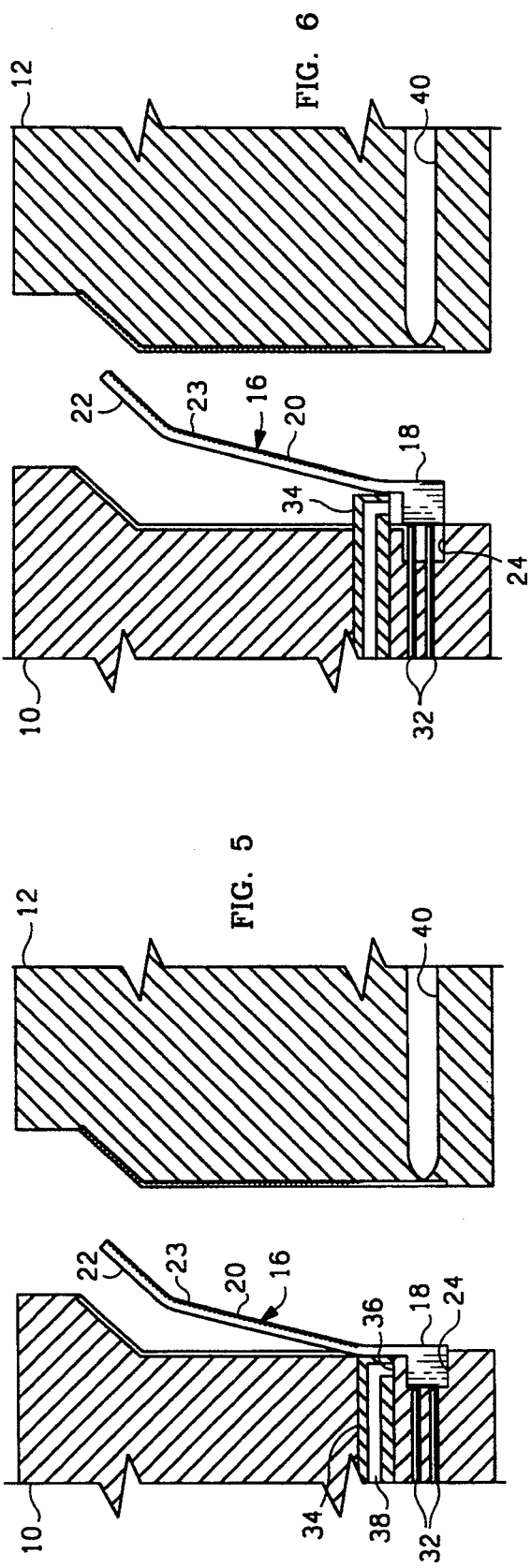

RAPID INJECTION MOLDING OF ELONGATED ARTICLES, SUCH AS CABLE TIES

BACKGROUND OF THE INVENTION

The present invention generally pertains to injection molding of elongated articles, such as cable ties, and is particularly directed to methods for reducing the cycle time for injection molding of such elongated articles.

A cable tie is an adjustable strap for bundling together articles such as cables or the like. Cable ties are also known as cable straps, cable clamps, cable clips, bundling ties, bundling straps, bundling clips, bundle ties, bundling belts, wire ties, ring clamps, adjustable clamps, harnessing devices, strap seals, binding straps, and ties. A typical cable tie includes an elongated strap with an adjacent locking head at one end of the strap, a tip at the opposite end of the strap and ratchet teeth on one side of the strap. The locking head defines an opening for allowing the tip end of the strap to be pulled through the opening and thereby form a closed loop around a bundle of articles. The locking head typically further includes a pawl having teeth with surfaces for engaging the ratchet teeth to lock the strap in the locking head after the tip end of the strap has been pulled through said opening. Examples of cable ties are described in U.S. Pat. Nos. 3,739,429, 3,924,299, 3,965,538, 4,473,524 and 4,573,242.

Cable ties are manufactured economically by a cyclic injection molding method, in which molten plastic material is injected into a mold cavity defining the cable tie and then allowed to solidify within the mold cavity. The mold parts defining the mold cavity are then separated and the cable tie is ejected, first from the mold parts and then from the space between the mold parts. A preferred material for cable ties is nylon.

SUMMARY OF THE INVENTION

The present invention provides methods for rapid injection molding of elongated articles, such as cable ties.

In accordance with one aspect of the present invention, a method of injection molding a cable tie having a head and a strap, includes the steps of (a) forming the cable tie by injecting molten plastic material into a mold cavity defined between a first mold part and a second mold part, wherein the first mold part includes a head region defining a portion of the head of the cable tie; (b) separating the first mold part from the second mold part while retaining said portion of the head of the cable tie in the head region of the first mold part; (c) ejecting the head of the cable tie from the first mold part: (d) protracting a nozzle positioned closely adjacent said head region from the first mold part: and (e) ejecting the cable tie from between the first and second mold parts by imparting against the ejected head of the cable tie a forceful fluid stream directed from the nozzle.

In accordance with still another aspect of the present invention, a method of injection molding a cable tie having a head and a strap, includes the steps of (a) forming the cable tie by injecting molten plastic material into a mold cavity defined between a first mold part and a second mold part, wherein the first mold part includes a head region defining a portion of the head of the cable tie: (b) separating the first mold part from the second mold part while retaining said portion of the head of the cable tie in the head region of the first mold part: (c) ejecting the head of the cable tie from the head region of the first mold part by pushing on the head with at least one ejector disposed to penetrate the head region from within the first mold part: and (d) pushing the ejected head of the cable tie away from said at least one ejector by pushing on the strap of the cable tie at a position that is closely adjacent the head with a component protracted from within the first mold part.

Additional features and advantages of the present invention are described in relation to the description of the preferred embodiment.

BRIEF DESCRIPTION OF THE DRAWING

FIG. 5 is a sectional view of the mold apparatus of FIGS. 1 and 4, with the mold parts being further separated and the tip of cable tie being completely separated from the mold cavity.

FIG. 6 is a sectional view of the mold apparatus of FIGS. 1, 4 and 5, with the mold parts being further separated and the cable tie being completely ejected from the mold cavity.

FIG. 7 is a sectional view of the mold apparatus of FIGS. 1, 4, 5 and 6, with the cable tie being ejected from between the mold parts by a forceful fluid stream directed from a closely adjacent nozzle after the cable tie is completely ejected from the mold cavity and separated from the ejector pins.

Figure 1:
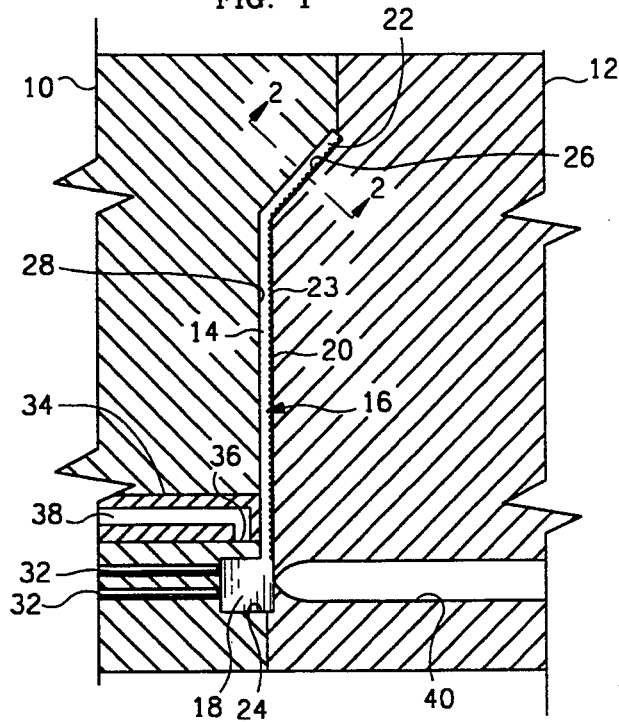
FIG. 1 is a sectional view of a preferred embodiment of the mold apparatus of the present invention, with the mold parts being combined to define the mold cavity for forming a cable tie.

The various features shown in the drawing are not drawn to scale.

DESCRIPTION OF THE PREFERRED EMBODIMENT

Referring to FIG. 1, a preferred embodiment of the injection molding apparatus of the present invention includes a first mold part 10 and a second mold part 12. The first mold part 10 is combined with second mold part 12 to define a mold cavity 14 for forming a cable tie 16. The cable tie 16 has a head 18 and a strap 20 terminating in a tip 22 for passing through the head 18. The portion of the mold cavity 14 defined by the second mold part 12 defines a series of teeth 23 on one side of the strap 20.

The first mold part 10 includes a head region 24 defining a major portion of the head 18 of the cable tie; and the second mold part 12 includes a tip region 26 defining a portion of the tip 22 of the cable tie. The tip region 26 extends at an angle from a portion 28 of the mold cavity 14 defining most of the strap 20, with said extension being directed away from the bulk of the first mold part 10.

Figure 2:
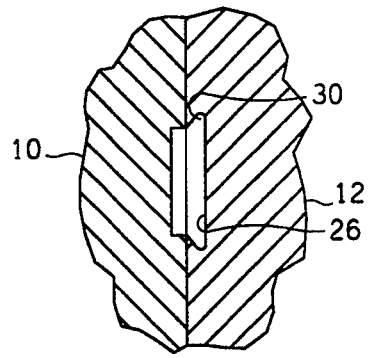
FIG. 2 is a sectional view taken along lines 2—2 in FIG. 1 of a portion of the mold cavity, without the cable tie being present therein.

Referring to FIG. 2, the tip region 26 includes an undercut region 30 from which the portion of the tip 22 formed therein can be removed only by sliding the tip 22 from the undercut region 30 by pulling the strap 20 of the cable tie 16 from the direction of the head 18.

Again referring to FIG. 1, the first mold part 10 further includes a pair of protractable ejector pins 32 and a protractable component 34 containing a nozzle 36 and an air passage 38 that communicates with a source of compressed air (not shown). The ejector pins 32 are disposed to penetrate the head region 18 from within the first mold part 10, when the ejector pins 32 are protracted.

The second mold part 12 includes a runner system 40, through which molten plastic material, such as Nylon 6.6, is injected into the mold cavity 14 to form the cable tie 16.

Figure 3:
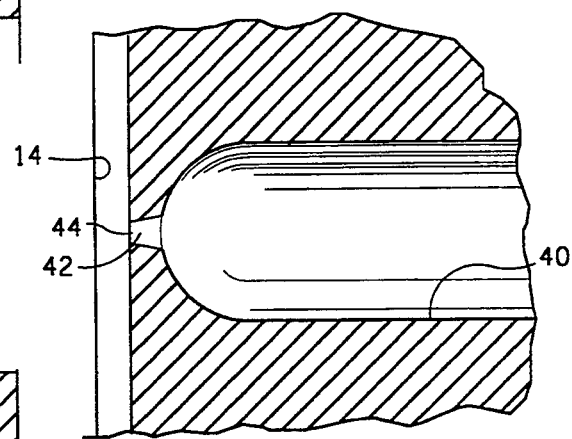
FIG. 3 is a view of that portion of FIG. 1 illustrated the juncture of the runner system with the mold cavity, with such portion being enlarged to illustrate the gate by which the runner system communicates with the mold cavity.

Referring to FIG. 3, the runner system 40 is an insulated runner system that communicates with the mold cavity 14 through a gate 42 that converges toward the mold cavity 14. It is pointed out that the runner system 40 communicates with the mold cavity 14 through only the gate 42 and not through a sprue cavity for forming an ejectable sprue, whereby no ejectable sprue is formed.

Unlike prior art apparatus for injection molding cable ties, the converging gate 42 does not have a hot tip adjacent thereto for applying heat to the plastic being injected into the mold cavity 14. A heated tip is unnecessary because of the shortness of the injection cycle achieved in accordance with the method of the present invention. Heretofore, it has not been possible to injection mold nylon products as light as from one to five grams while using an insulated runner system without heated tips. Through use of the present invention, it has been proven possible to injection mold products in a range of one to five grams at a weight per cycle-time-squared of from 0.1 to 0.5 grams per square second.

By providing a gate 42 that converges toward the mold cavity 14, the cable tie 16 separates from the molten plastic at the edge 44 of the mold cavity 14 when the cable tie is separated from the mold cavity 14 to thereby at least substantially reduce the size of any gate spill formed on the cable tie 16. The method of the present invention has been successfully practiced with a gate opening diameter at the edge 44 of the mold cavity 14 being within a range of between approximately 1.5 mm and approximately 2.5 mm, and with the angle of convergence between the walls of the gate 42 being within a range of between approximately 15 degrees and approximately 30 degrees. A gate opening diameter of 1.8 mm and an angle of convergence of 22 degrees are preferred when injecting Nylon 6.6.

Figure 4:
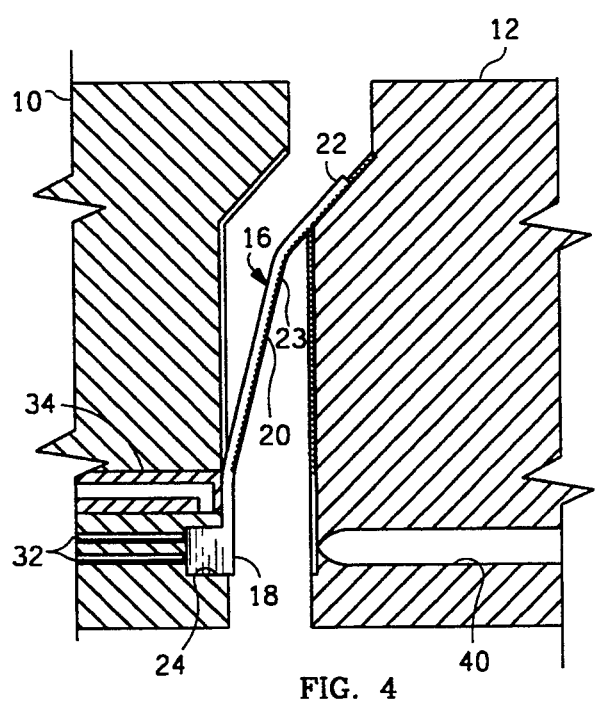
FIG. 4 is a sectional view of the mold apparatus of FIG. 1, with the mold parts being separated and the cable tie being partially removed from the mold cavity.

Referring to FIG. 4, the first mold part 10 is separated from the second mold part 12 while retaining the major portion of the head 18 of the cable tie 16 in the head region 24 of the first mold part and a portion of the tip 22 of the cable tie 16 in the undercut region 30 of the second mold part 12, in order to separate the head 18 of the cable tie from the second mold part 12, to separate the tip 22 from the first mold part 10, and to separate a major portion of the strap 20 of the cable tie 16 from both the first and second mold parts 10, 12. By retaining a portion of the head 18 in the first mold part 10 and a portion of the tip 22 in the second mold part 12, while the first and second mold parts 10, 12 are separated from each other, the major portion of the strap 20 is quickly peeled from the first and second mold parts 10, 12 to reduce the ejection portion of the overall cycle time.

Referring to FIG. 5, the first mold part 10 is further separated from the second mold 12 part while still retaining the major portion of the head 18 of the cable tie 16 in the head region 24 of the first mold part 10 to thereby remove the tip 22 of the cable tie from the tip region 26 of the second mold part 12 by pulling the strap 20 of the cable tie 16 from the direction of the head 18 to slide the tip 22 from the undercut region 30. It is noted that due to such pulling action, the angle at which the tip 22 of the cable tie 16 extends away from a straight line along most of the length of the strap 20 is less than the angle at which the tip region 26 of the mold cavity 14 extends away from a vertical line through the portion 28 of the mold cavity defining most of the length of the strap 20.

Referring to FIG. 6, the first mold part 10 is further separated from the second mold 12 part, and the ejector pins 32 are protracted to eject the head 18 of the cable tie 16 from the head region 24 of the first mold part 10 by pushing on the head 18 with the ejector pins 32. At the same time the component 34 is also protracted to push on the strap 20 of the cable tie 16 at a position that is closely adjacent the head 18.

Referring to FIG. 7, the first mold part 10 is further separated from the second mold 12 part, and only the component 34 is further protracted to push the ejected head 18 of the cable tie 16 away from the ejector pins 32 by pushing on the strap 20 of the cable tie at the position that is closely adjacent the head 18. The ejector pins 32 are not further protracted. A forceful stream of air is then imparted on the head 18 from the closely adjacent nozzle 36 within the protracted component 34 to thereby quickly eject the cable tie 16 from between the first and second mold parts 10, 12.

The stream of air from the nozzle 36 also cools the head 18 of the cable tie 16 so that the cable tie can be ejected at an earlier time in the overall cycle.

The present invention obviates the need for ejection pins along most of the length of the mold cavity 14, as used in the prior art.

The present invention preferably is used in multi-cavity injection molding apparatus.

We claim:

1. A method of injection molding a cable tie having a head and a strap, the method comprising the steps of
   (a) forming the cable tie by injecting molten plastic material into a mold cavity defined between a first mold part and a second mold part, wherein the first mold part includes a head region defining a portion of the head of the cable tie;
   (b) separating the first mold part from the second mold part while retaining said portion of the head of the cable tie in the head region of the first mold part;
   (c) ejecting the head of the cable tie from the first mold part;
   (d) protracting a nozzle positioned closely adjacent said head region from the first mold part; and
   (e) ejecting the cable tie from between the first and second mold parts by imparting against the ejected head of the cable tie a forceful fluid stream directed from the nozzle.

2. A method according to claim 1, further comprising the step of
   (f) pushing the ejected head of the cable tie away from the first mold part by pushing on the strap of the cable tie at a position that is closely adjacent the head with a protracted component containing the nozzle.

3. A method of injection molding a cable tie having a head and a strap, the method comprising the steps of
   (a) forming the cable tie by injecting molten plastic material into a mold cavity defined between a first mold part and a second mold part, wherein the first mold part includes a head region defining a portion of the head of the cable tie;
   (b) separating the first mold pan from the second mold part while retaining said portion of the head of the cable tie in the head region of the first mold part;
   (c) ejecting the head of the cable tie from the head region of the first mold part by pushing on the head with at least one ejector disposed to penetrate the head region from within the first mold part; and
   (d) pushing the ejected head of the cable tie away from said at least one ejector by pushing on the strap of the cable tie at a position that is closely adjacent the head with a component protracted from within the first mold part.

4. A method of injection molding an elongated article having a head and a strap, the method comprising the steps of
   (a) forming the elongated article by injecting molten plastic material into a mold cavity defined between a first mold part and a second mold part, wherein the first mold part includes a head region defining a portion of the head of the elongated article;
   (b) separating the first mold part from the second mold part while retaining said portion of the head of the elongated article in the head region of the first mold part;
   (c) ejecting the head of the elongated article from the first mold part;
   (d) protracting a nozzle positioned closely adjacent said head region from the first mold part; and
   (e) ejecting the elongated article from between the first and second mold parts by imparting against the ejected head of the elongated article a forceful fluid stream directed from the nozzle.

5. A method according to claim 4, further comprising the step of
   (f) pushing the ejected head of the elongated article away from the first mold part by pushing on the strap of the elongated article at a position that is closely adjacent the head with a protracted component containing the nozzle.

6. A method of injection molding an elongated article having a head and a strap, the method comprising the steps of
   (a) forming the elongated article by injecting molten plastic material into a mold cavity defined between a first mold part and a second mold part, wherein the first mold part includes a head region defining a portion of the head of the elongated article;
   (b) separating the first mold part from the second mold part while retaining said portion of the head of the elongated article in the head region of the first mold part;
   (c) ejecting the head of the elongated article from the head region of the first mold part by pushing on the head with at least one ejector disposed to penetrate the head region from within the first mold part; and
   (d) pushing the ejected head of the elongated article away from said at least one ejector by pushing on the strap of the elongated article at a position that is closely adjacent the head with a component protracted from within the first mold part.

* * * * *